United States Patent
Wang et al.

(10) Patent No.: US 10,956,583 B2
(45) Date of Patent: Mar. 23, 2021

(54) MULTI-PHASE DIGITAL CONTENT PROTECTION

(71) Applicant: AT&T Intellectual Property I, L.P., Atlanta, GA (US)

(72) Inventors: Xin Wang, Rancho Palos Verdes, CA (US); Raynold Kahn, Los Angeles, CA (US); Luan Le-Chau, Los Angeles, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 320 days.

(21) Appl. No.: 16/020,327

(22) Filed: Jun. 27, 2018

(65) Prior Publication Data
US 2020/0004970 A1   Jan. 2, 2020

(51) Int. Cl.
| | | |
|---|---|---|
| *G06F 21/60* | (2013.01) | |
| *H04L 9/08* | (2006.01) | |
| *H04L 9/32* | (2006.01) | |
| *H04L 9/14* | (2006.01) | |
| *H04L 29/06* | (2006.01) | |

(52) U.S. Cl.
CPC .......... *G06F 21/602* (2013.01); *H04L 9/0869* (2013.01); *H04L 9/14* (2013.01); *H04L 9/3268* (2013.01); *H04L 63/0876* (2013.01)

(58) Field of Classification Search
CPC ........ G06F 21/602; G06F 21/33; G06F 21/10; H04L 9/0869; H04L 9/3268; H04L 9/14; H04L 63/0876; H04L 63/0428; H04L 2463/061; H04L 63/101; H04L 2209/60
See application file for complete search history.

(56) References Cited

U.S. PATENT DOCUMENTS

| | | | |
|---|---|---|---|
| 6,223,291 B1 * | 4/2001 | Puhl | G06F 21/10 726/28 |
| 8,336,091 B2 | 12/2012 | Wong | |
| 8,539,233 B2 * | 9/2013 | Dubhashi | G06F 21/10 713/168 |
| 8,700,535 B2 * | 4/2014 | Bourne | H04L 63/104 705/59 |
| 8,744,969 B2 * | 6/2014 | Peinado | G06F 21/10 705/51 |
| 8,769,657 B2 | 7/2014 | Zaitsev | |

(Continued)

OTHER PUBLICATIONS

"What is TechTarget", Nov. 2017, https://whatis.techtarget.com/definition/IoT-gateway#:~:text=An%20Internet%20of%20Things%20(IoT,controllers%2C%20sensors%20and%20intelligent%20devices.&text=Another%20benefit%20of%20an%20IoT,and%20the%20data%20it%20transports.*

*Primary Examiner* — Jung W Kim
*Assistant Examiner* — Thomas Ho

(57) ABSTRACT

In one example, the present disclosure describes a device, computer-readable medium, and method for multi-phase protection of digital content. For instance, in one example, a method includes receiving a request for digital content from a client device, initiating a digital content protection process comprising a plurality of phases, where each phase of the plurality of phases includes verifying credentials provided by the client device, delivering a plurality of seeds to the client device, wherein each individual seed of the plurality of seeds is delivered to the client device upon a successful completion of one phase of the plurality of phases, encrypting the digital content, using an encryption key derived using the plurality of seeds, to generate encrypted content, and delivering the encrypted content to the client device.

20 Claims, 6 Drawing Sheets

(56) References Cited

U.S. PATENT DOCUMENTS

| | | |
|---|---|---|
| 8,813,204 B2 | 8/2014 | Leggette |
| 9,147,061 B1 | 9/2015 | McClendon et al. |
| 9,230,070 B2 | 1/2016 | Farha |
| 9,436,804 B2 * | 9/2016 | Marsh .................. G06F 21/602 |
| 9,641,528 B2 | 5/2017 | Little et al. |
| 9,699,165 B2 | 7/2017 | Okamoto et al. |
| 2003/0084306 A1 * | 5/2003 | Abburi .................... G06F 21/10 |
| | | 713/188 |
| 2005/0195975 A1 * | 9/2005 | Kawakita ............. H04L 9/0825 |
| | | 380/30 |
| 2006/0064582 A1 * | 3/2006 | Teal .................. H04L 63/0823 |
| | | 713/156 |
| 2007/0011452 A1 | 1/2007 | Marquet et al. |
| 2012/0089835 A1 * | 4/2012 | Peckover ............... H04L 63/08 |
| | | 713/168 |
| 2015/0331821 A1 * | 11/2015 | Liston .................... G06F 13/42 |
| | | 710/106 |
| 2017/0064356 A1 * | 3/2017 | Kahn ................ H04N 21/4627 |

* cited by examiner

MULTI-PHASE DIGITAL CONTENT PROTECTION

The present disclosure relates generally to access controls for digital content, and relates more particularly to devices, non-transitory computer-readable media, and methods for multi-phase digital content protection.

BACKGROUND

Digital technologies have made it easier to distribute content (e.g., video, audio, and other types of media content) to large numbers of users. In some cases, a group of users may share (or may have access to) a subscription to a service that makes digital content available. For instance, a home, a college campus, a hospital, a hotel, or another type of residence or enterprise may subscribe to service that provides digital content, and may in turn allow authorized users (e.g., family members, students, employees, patients, customers) to use the subscription to access the digital content.

SUMMARY

In one example, the present disclosure describes a device, computer-readable medium, and method for multi-phase protection of digital content. For instance, in one example, a method includes receiving a request for digital content from a client device, initiating a digital content protection process comprising a plurality of phases, where each phase of the plurality of phases includes verifying credentials provided by the client device, delivering a plurality of seeds to the client device, wherein each individual seed of the plurality of seeds is delivered to the client device upon a successful completion of one phase of the plurality of phases, encrypting the digital content, using an encryption key derived using the plurality of seeds, to generate encrypted content, and delivering the encrypted content to the client device.

In another example, a software defined networking local access element includes a processor and a computer-readable medium storing instructions which, when executed by the processor, cause the processor to perform operations. The operations include receiving a request for digital content from a client device, initiating a digital content protection process comprising a plurality of phases, where each phase of the plurality of phases includes verifying credentials provided by the client device, delivering a plurality of seeds to the client device, wherein each individual seed of the plurality of seeds is delivered to the client device upon a successful completion of one phase of the plurality of phases, encrypting the digital content, using an encryption key derived using the plurality of seeds, to generate encrypted content, and delivering the encrypted content to the client device.

In another example, a non-transitory computer-readable medium stores instructions which, when executed by the processor of a client device, cause the processor to perform operations. The operations include sending, by the client device, a request for accessing digital content, engaging, by the client device, in a digital content protection process with a server, wherein the digital content protection process comprises a plurality of phases, and wherein each phase of the plurality of phases includes providing credentials to the server, receiving, by the client device, a plurality of seeds from the server, wherein each individual seed of the plurality of seeds is received by the client device upon a successful completion of one phase of the plurality of phases, receiving, by the client device, the digital content in an encrypted form upon a successful completion of all phases of the plurality of phases, and decrypting, by the client device, the digital content using a decryption key derived using the plurality of seeds.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
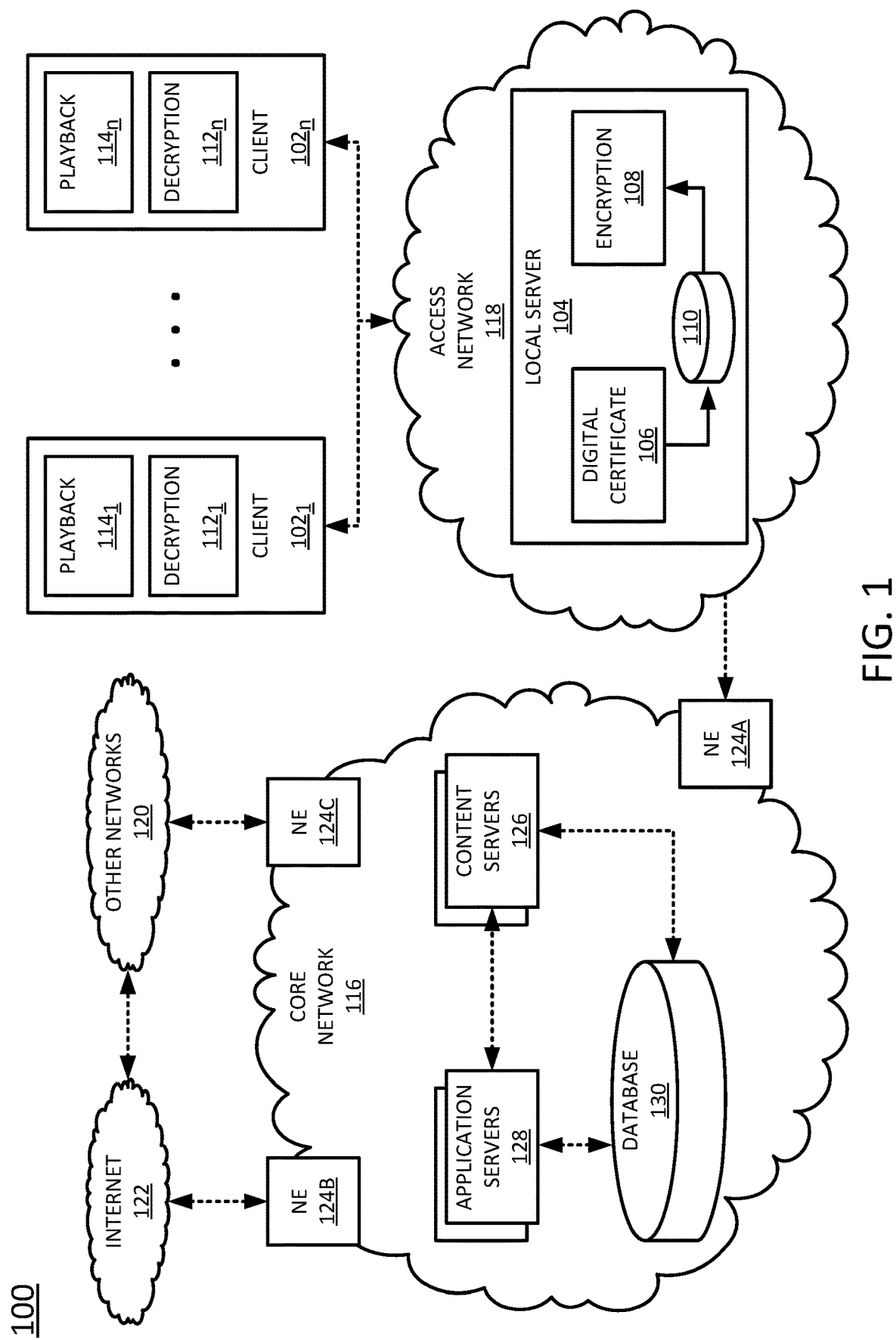
FIG. 1 illustrates an example network related to the present disclosure.

In one example, the present disclosure provides a system, method, and non-transitory computer readable medium for multi-phase digital content protection. As discussed above, a group of users may share (or have access to) a subscription to a service that makes digital content available. For instance, a home, a college campus, a hospital, a hotel, or another type of residence or enterprise may subscribe to service that provides digital content, and may in turn allow authorized users (e.g., family members, students, employees, patients, customers) to use the subscription to access the digital content. These authorized users (or their endpoint devices) may be provided with usage rights and decryption keys that can be used to access digital content covered by the service. These usage rights and decryption keys are typically unique to specific endpoint devices.

In many existing content protection systems, the decryption keys are generated and distributed during a single phase of the multi-phase digital content protection process (i.e., the process that determines whether a user is authorized to receive digital content). For instance, the digital content protection process may include at least the following phases: manufacture, registration, authentication, and authorization. During these phases, a source of digital content (or an entity acting on its behalf) and an endpoint device wishing to access the digital content may exchange certain information in order to verify that the endpoint device, or the user using the endpoint device, is authorized to access the digital content. However, the decryption keys are often generated and distributed only after the last phase is completed, i.e., after the endpoint device, or the user using the endpoint device, is determined to be authorized. This leaves the decryption keys vulnerable to unauthorized sharing and/or manipulation by unauthorized devices, since the decryption keys are generated independently of the outcomes of the other phases of the digital content protection process. For instance, the credentials for receiving the decryption key (e.g., authorization tokens) could be intercepted by or shared with an unauthorized endpoint device, thereby allowing that unauthorized endpoint device to derive the decryption key and access the digital content.

Examples of the present disclosure strengthen the protection of digital content by generating content encryption and decryption keys using a plurality of seeds (e.g., device identification values, random numbers, encrypted keys, etc.) that are gathered during multiple phases of the digital content protection process. The seeds may be pre-installed/implanted, injected, delivered in-band with digital content, delivered out-of-band separately from the digital content (e.g., via a digital rights management (DRM) license server or other device), or updated during at least one phase of the digital content protection process. In one example, each individual seed is delivered to a client requesting digital content upon successful completion (e.g., verification) of one phase of the digital content protection process. Once all phases have been successfully completed, the digital content may be encrypted using an encryption key derived from the plurality of seeds. The client device may subsequently decrypt the digital content by using a corresponding decryption key derived from the plurality of seeds.

In one example, this approach allows an endpoint device to derive its unique decryption key without having the decryption key explicitly delivered to it. Thus, an endpoint device cannot obtain a decryption key unless the endpoint device has participated in (and successfully completed) all phases of the digital content protection process that provide the seed information from which the decryption key is generated.

To better understand the present disclosure, FIG. 1 illustrates an example network 100 related to the present disclosure. As shown in FIG. 1, the network 100 may comprise a content distribution network (e.g., data network) that connects various client devices $102_1$-$102_n$ (hereinafter individually referred to as a "client device 102" or collectively referred to as "client devices 102") with one another and with various other devices via a core network 116, an access network 118, other networks 120, and/or the Internet 122.

Client devices 102 may include any devices that are capable of receiving data over a network (e.g., in the form of a stream of packets), and decrypting the data to extract media content. The client devices 102 may also be capable of playing back the media content. For instance, the client devices 102 may include desktop computers, laptop computers, tablet computers, mobile phones, set top boxes, gaming consoles, Internet of Things (IoT) devices, wearable "smart" devices (e.g., watches, fitness trackers, and the like), Internet-ready televisions and radios, satellite receivers, and/or other types of devices. In one example, all of the client devices 102 are geographically located within a common site, such as a home, a college campus, a hospital, a hotel, or another type of residence or enterprise. In another example, the client devices 102 may be located in different geographic locations, but may connect to a network via a common local server 104.

In one example, each client device 102 includes a respective decryption module $112_1$-$112_n$ (hereinafter individually referred to as a "decryption module 112" or collectively referred to as "decryption modules 112") and a respective playback device $114_1$-$114_n$ (hereinafter individually referred to as a "playback device 112" or collectively referred to as "playback devices 114"). Each decryption module 112 may include a processor and a non-transitory computer readable storage medium that contains instructions executable by the processor. The instructions may include instructions that allow the client device 102 to decrypt digital content according to the process described in further detail with respect to FIGS. 2 and 3. The playback device 112 may include any type of output device that allows the client device 102 to play the decrypted digital content (e.g., a display, a speaker, etc.).

As illustrated in FIG. 1, the network 100 includes a core network 116. In one example, core network 116 may functionally comprise a fixed mobile convergence (FMC) network, e.g., an IP Multimedia Subsystem (IMS) network. In addition, core network 116 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 116 may also further comprise a broadcast television network, e.g., a traditional cable provider network or an Internet Protocol Television (IPTV) network, as well as an Internet Service Provider (ISP) network. The network elements 124A-124C may serve as gateway servers or edge routers to interconnect the core network 116 with other networks 120, Internet 122, access network 118, and so forth. As shown in FIG. 1, core network 116 may also include a plurality of content servers 126, a plurality of application servers 128, and a database 130. For ease of illustration, various additional elements of core network 116 are omitted from FIG. 1.

In one example, content servers 126 may store a large library of digital content (e.g., web pages, images, videos, audio files, and the like) on a cluster of devices, where different content may be stored on different physical devices and/or where portions of one or more items of content, e.g., chunks of data may be split across different physical devices. Some of this data may also be stored in the database 130.

The application servers 128 may host applications and/or services that operate in conjunction with the content servers 126 to deliver digital content to the client devices 102. In one example, at least one of these applications is designed to prevent the digital content from being accessed by unauthorized users. For instance, at least one of the applications may comprise an encryption application that encrypts digital content before it is delivered to the client devices 102, according to the process described in further detail with respect to FIG. 2. In another example, at least one of the applications comprises an application that interacts with the client devices 102 to derive a key for decrypting encrypted digital content, according to the process described in further detail with respect to FIG. 4. Thus, the application servers 128 may be owned and operated by a service provider, such as a service provider that provides telecommunications services (e.g., landline/mobile telephone service, Internet service, cable television service, etc.).

The database 130 may persistently store seed information ("seeds") for deriving decryption keys. These seeds may comprise, for example, device identification values, random numbers, encrypted keys, and/or other types of data. For instance, the database 130 may store seeds associated with registered devices at various sites, where the seeds may be scheduled (i.e., set and/or distributed to a client device) at installation or registration of the registered devices. The seeds stored in the database 130 may be periodically or non-periodically updated.

In one example, the access network 118 may comprise a Local Area Network (LAN), a cellular or wireless access network, a 3rd party network, and the like. In this regard, access network 118 may include a local server 104 that communicates with the core network 112 to provide digital content to the client devices 102. To this end, the local server 104 may function as a gateway or site head-end that interfaces the content server 126 and application servers 128 of the core network 116 with the client devices 102 that are associated with a common site. Thus, the local server may be owned and operated by the owner or operator of the site. The local server 104 may include a digital certificate 106, an encryption module 108, and/or a database 110.

The digital certificate 106 may be issued by a certification authority (CA) and may certify ownership of a public encryption key by the local server 104. The digital certificate 106 allows other entities (e.g., client devices 102, content servers 126, and application servers 128) to rely upon signatures and/or assertions made about the private key that corresponds to the public key. The digital certificate 106 may be stored in the database 110. The database 110 may also store seeds for deriving decryption keys. These seeds may comprise, for example, device identification values, random numbers, encrypted keys, and/or other types of data. For instance, the database 110 may persistently store seeds associated with registered devices at the site associated with the local server 104, where the seeds may be assigned (i.e., set and/or labeled to a client device) at the times of manufacture and registration. The database 110 may also persistently store seeds associated with authenticated devices at the site associated with the local server 104, where the seeds may be scheduled (i.e., set and/or distributed to a client device) at the time of authentication. The database 110 may also store seeds associated with authorized digital content (e.g., all channels, pay-per-view or on-demand channels, individual programs, etc.), where the seeds may be scheduled at the time of authorization or playback of the digital content. The seeds stored in the database 110 may be periodically or non-periodically updated.

The encryption module 108 may be configured to encrypt digital content in a manner that allows the digital content to be decrypted by an authorized client device 102. The encryption module 108 may include a processor and a non-transitory computer-readable storage medium containing instructions executable by the processor. The instructions may include instructions that allow the local server 104 to encrypt digital content according to the process described in further detail with respect to FIGS. 2 and 3. The instructions may also include instructions that allow the local server 104 to receive digital content from the content servers 126 in the core network 116, and to decrypt the digital content if it is encrypted.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional client devices, access networks, network elements, application servers, etc. without altering the scope of the present disclosure. For example, core network 116 is not limited to an IMS network. Similarly, the present disclosure is not limited to an IP/MPLS network for VoIP telephony services, or any particular type of broadcast television network for providing television services, and so forth.

Figure 2:
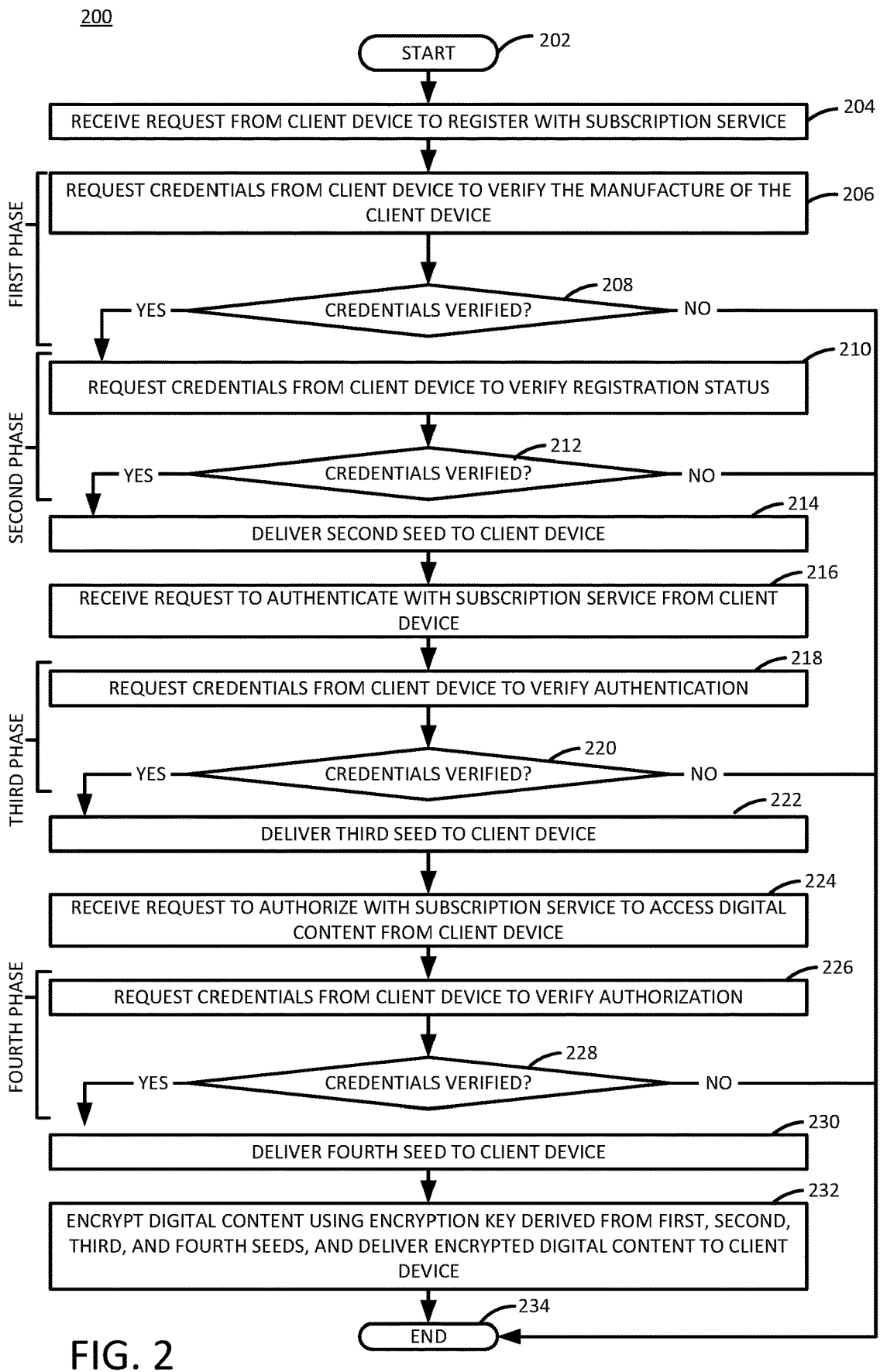
FIG. 2 illustrates a flowchart of an example method for exchanging information to deliver seeds in order to derive a decryption key for decrypting digital content.

To further aid in understanding the present disclosure, FIG. 2 illustrates a flowchart of an example method 200 for exchanging information in order to deliver seeds to derive a decryption key for decrypting digital content. In one example, the method 200 may be performed by one of the application servers 128 or by the encryption module 108 illustrated in FIG. 1 (e.g., by an entity responsible for ensuring protection of digital content). However, in other examples, the method 200 may be performed by another device, such as the content servers 126 in the core network 116. As such, any references in the discussion of the method 200 to the application servers 128, the content servers 126, or the encryption module 108 of FIG. 1 (or any other elements of FIG. 1) are not intended to limit the means by which the method 200 may be performed. In one example, the method 200 works in conjunction with a digital content protection process that comprises a plurality of phases for verifying whether a client device is authorized to receive protected digital content.

The method 200 begins in step 202. In step 204, a request to register with a subscription service that provides access digital content is received from a client device. In one example, the client device is an endpoint device that is coupled to a local network or to an access network that serves a specific site accessible by multiple endpoint devices (e.g., a home, a college campus, a hospital, a hotel, or the like). Thus, before delivering the digital content to the client device, it must be confirmed that the client device is authorized to receive the digital content (e.g., that the client device is the authorized device it claims to be).

In step 206, credentials are requested from the client device to verify the manufacture (e.g., make, model, and/or version) of the client device. That is, in one example, the first phase of the multi-phase digital content protection process is to verify that the client device requesting the digital content is manufactured by an expected vendor, and is capable of performing derivation of content decryption keys with appropriate seeds placed at the time of device manufacture (or provisioning). The credentials may comprise, for instance, device identification values (e.g., serial numbers) or other information (e.g., chipset make, model, and or version) from which the client device can be identified and ensured to be correctly manufactured.

In step 208, it is determined whether the credentials provided by the client device in response to the request in step 206 are verified. In one example, the credentials are verified if they match stored manufacture information for the client device (e.g., stored make, model, and/or version information). If the credentials are not verified in step 208, then the method 200 ends in step 234. However, if the credentials are verified in step 208, then the first phase (e.g., the manufacture phase) of the multi-phase digital content protection process may be considered complete, and the method 200 may proceed to the second phase in step 210.

Moreover, in one example, if the credentials are verified in step 208, it is assumed that the vendor who manufactured the client device has implanted, pre-installed, or otherwise stored a first (manufacture) seed, $S'_M$, in the client device. In one example, the first seed $S'_M$ is associated with a collection of devices (typically for a service provider). This first seed $S'_M$ may be used to derive a first root key, $K_R$, from a set of common root key across a set of client devices. Moreover, the first seed $S'_M$ may be updated by the vendor when needed. In one example the first seed $S'_M$ is a seed used to ultimately generate a decryption key K' and corresponds to a seed $S_M$ that is used to generate a corresponding encryption key K.

In step 210, credentials are requested from the client device to verify the registration of the client device. The credentials requested in step 210 may comprise, for instance, a content service subscription account number, a subscriber's login credentials (e.g., user ID and password), the client device's physical location, the client device's network IP address, the client device's media access control (MAC) address, or other information from which the client device can be identified as being correctly registered to a service subscription and location. That is, in one example, the second phase of the multi-phase digital content protection process is to verify that the client device registration is installed, or otherwise activated, with a global server (e.g., application server 128 of FIG. 1) that maintains a whitelist for the site from which the client device is purported to be connecting to the network (possibly at a correct physical location, such as a hotel room, within an access network at the site).

In step 212, it is determined whether the credentials provided by the client device in response to the request in step 210 are verified. In one example, the credentials are verified if the server can confirm that the client device is registered with the global server and at the registered physical and/or network location at the site. If the credentials are not verified in step 212, then the method 200 ends in step 234.

However, if the credentials are verified in step 212, then the method 200 proceeds to step 214, where a second (registration) seed, $S'_R$, is delivered to the client device. In one example, the second seed $S'_R$ is associated with registered devices at the site from which the client device is purported to be connecting to the network. In one example, the second seed $S'_R$ is delivered in an encrypted form that can be decrypted using the first root key $K_R$. Thus, the client device will not be able to obtain the second seed $S'_R$ unless it both: (1) passes the manufacture phase (which implies that the client device possesses the first seed $S'_M$ necessary to obtain the first root key $K_R$); and (2) passes the registration phase. In one example, the second seed $S'_R$ can be updated, e.g., by the global server when the client device re-registers with the global server after a period of not being active, and/or as requested by the system. In one example the second seed $S'_R$ is a seed that is ultimately used to generate the decryption key K' and corresponds to a seed $S_R$ that is used to generate the corresponding encryption key K.

In step 216, a request to authenticate with the subscription service to access digital content is received from the client device.

In step 218, credentials are requested from the client device to verify the authentication of the client device. The credentials requested in step 218 may comprise, for instance, a subscriber's login credentials (e.g., user ID and password), the client device's physical location, the client device's network IP address, the client device's media access control (MAC) address, or other information from which the client device can be identified as being previously registered with the global server. The client device may be challenged to see if it possesses the second (registration) seed $S'_R$ that it is expected to have received during the second (registration) phase. That is, in one example, the third phase of the multi-phase digital content protection process is to verify that the requesting client device is authenticated with the global server that maintains the whitelist for the site from which the client device is purported to be connecting to the network, previously registered, and in good standing (e.g., not known to be compromised in terms of behavior and security).

In step 220, it is determined whether the credentials provided by the client device in response to the request in step 218 are verified. In one example, the credentials are verified if the server can confirm that the client device is authenticated with the global server. In another example, the credentials are verified if the server can engage an (authentication) challenge protocol with the client device to attest that the client device possesses the second (registration seed $S'_R$ it is expected to have received during the second (registration) phase. If the credentials are not verified in step 220, then the method 200 ends in step 234.

However, if the credentials are verified in step 220, then the method 200 proceeds to step 222, where a third (authentication) seed, $S'_N$, is delivered to the client device. In one example, the third seed $S'_N$ is associated with authenticated devices. In one example, the third seed $S'_N$ is delivered in an encrypted form that can be decrypted using a second root key $K_N$, where the second root key $K_N$ can be obtained using the second seed $S'_R$ and the first root key $K_R$. Thus, the client device will not be able to obtain the third seed $S'_N$ unless it: (1) passes the manufacture phase (which implies that the client device possesses the first seed $S'_M$ necessary to obtain the common root key $K_R$); (2) passes the registration phase (which implies that it has been provided with the second seed $S'_R$); and (3) passes the authentication phase. In one example, the third seed $S'_N$ can be updated, e.g., after every authentication phase, after an idle (time-out) period, and/or as requested by the system. The third seed $S'_N$ may be updated and persistently stored by the local server 104. In one example the third seed $S'_N$ is a seed that is ultimately used to generate the decryption key K' and corresponds to a seed $S_N$ that is used to generate the corresponding encryption key K.

In step 224, a request to authorize with the subscription service to access digital content is received from the client device.

In step 226, credentials are requested from the client device to verify the authorization of the client device. The credentials may comprise, for instance, authentication results (e.g., in the form of an authentication token, a cookie, and/or a ticket), a subscription membership, an identification of a piece or a collection of pieces of digital content to be accessed, a proof that the digital content has been purchased, the length of time the digital content was previously accessed by the client device, the number of concurrent content accessing sessions, or other information from which the client device can be identified as being previously authenticated with the global server and permitted to access the requested digital content. The client device may be challenged to see if it possesses the third (authentication) seed $S'_N$ it is expected to have received during the third (authentication) phase. That is, in one example, the fourth phase of the multi-phase digital content protection process is to verify that the requesting client device is authorized to access the digital content.

In step 228, it is determined whether the credentials provided by the client device in response to the request in step 226 are verified. In one example, the credentials are verified if the client device is authorized to access the digital content. If the credentials are not verified in step 228, then the method 200 ends in step 234.

However, if the credentials are verified in step 228, then the method 200 proceeds to step 230, where a fourth seed, $S'_Z$, is delivered to the client device. In one example, the fourth seed $S'_Z$ is associated with authorized digital content (e.g., all channels, pay-per-view channels, on-demand channels, individual programs, etc.). In one example, the fourth seed $S'_Z$ is delivered in an encrypted form that can be decrypted using a third root key $K_Z$, where the third root key $K_Z$ can be obtained using the third seed $S'_N$ and the second root key $K_N$. Thus, the client device will not be able to obtain the fourth seed $S'_Z$ unless it: (1) passes the manufacture phase (which implies that the client device possesses the first seed $S'_M$ necessary to obtain the common root key $K_R$); (2) passes the registration phase (which implies that it has been provided with the second seed S'R); (3) passes the authentication phase (which implies that it has been provided with the third seed $S'_N$); and (4) passes the authorization phase. In one example, the fourth seed $S'_Z$ can be updated, e.g., with periodic authorization or a request by the system. The fourth seed $S'_Z$ may be updated by the local server 104. The periodic authorization may be performed via a digital rights management (DRM) license server, may be performed in-band with the digital content, or may be performed in another way. In one example the fourth seed $S'_Z$ is a seed that is ultimately used to generate the decryption key K' and corresponds to a seed $S_Z$ that is used to generate the corresponding encryption key K.

Once the first, second, third, and fourth seeds $S'_M$, $S'_R$, $S'_N$, and $S'_Z$ have been delivered to the client device, the method 200 proceeds to step 232. In step 232, the requested digital content is encrypted using an encryption key K derived from encryption-side seeds corresponding to the first, second, third, and fourth seeds (i.e., $S_M$, $S_R$, $S_N$, and $S_Z$). For instance, in one example, the encryption key K is derived from the third root key $K_Z$ and the encryption-side seed $S_Z$ corresponding to the fourth seed $S'_Z$. The encrypted digital content is then delivered to the client device. In another example, steps 230 and 232 may be combined in a single step, e.g., such that the fourth seed $S'_Z$ is delivered in-band with the encrypted digital content (e.g., in a multicast transport stream). In another example still, a DRM license server may deliver the fourth seed $S'_Z$ to the client device out-of-band (i.e., separately from the encrypted digital content).

The method 200 ends in step 234.

Thus, the method 200 ensures that only those client devices that are: (1) manufactured by the right vendor(s); (2) registered with the right server(s); (3) authenticated from time to time; and (4) authorized periodically are able to receive all of the seeds that are necessary to derive the encryption and decryption keys used to protect digital content. Multiple seeds for generating a decryption key are delivered in multiple phases of the digital content protection process. In one example, no phase of the digital content protection process can proceed until or unless the immediately previous phase has completed successfully. Thus, each phase must be completed successfully in order for a requesting client device to receive all of the seeds. Accordingly, if an unauthorized client device attempted to impersonate an authorized device, it would need to somehow intercept or obtain all of these multiple seeds, which is more difficult that intercepting or obtaining just a single decryption key.

In one example, the seeds delivered during the various phases are encrypted, and must be decrypted using root keys that are obtained using the seeds delivered and root keys derived in previous phases, such an approach may be referred to as a "key ladder." In other examples, rather than employ a key ladder, the authenticity of individual seeds may be verified by checking hash values or digital signatures associated with the seeds.

Figure 3:
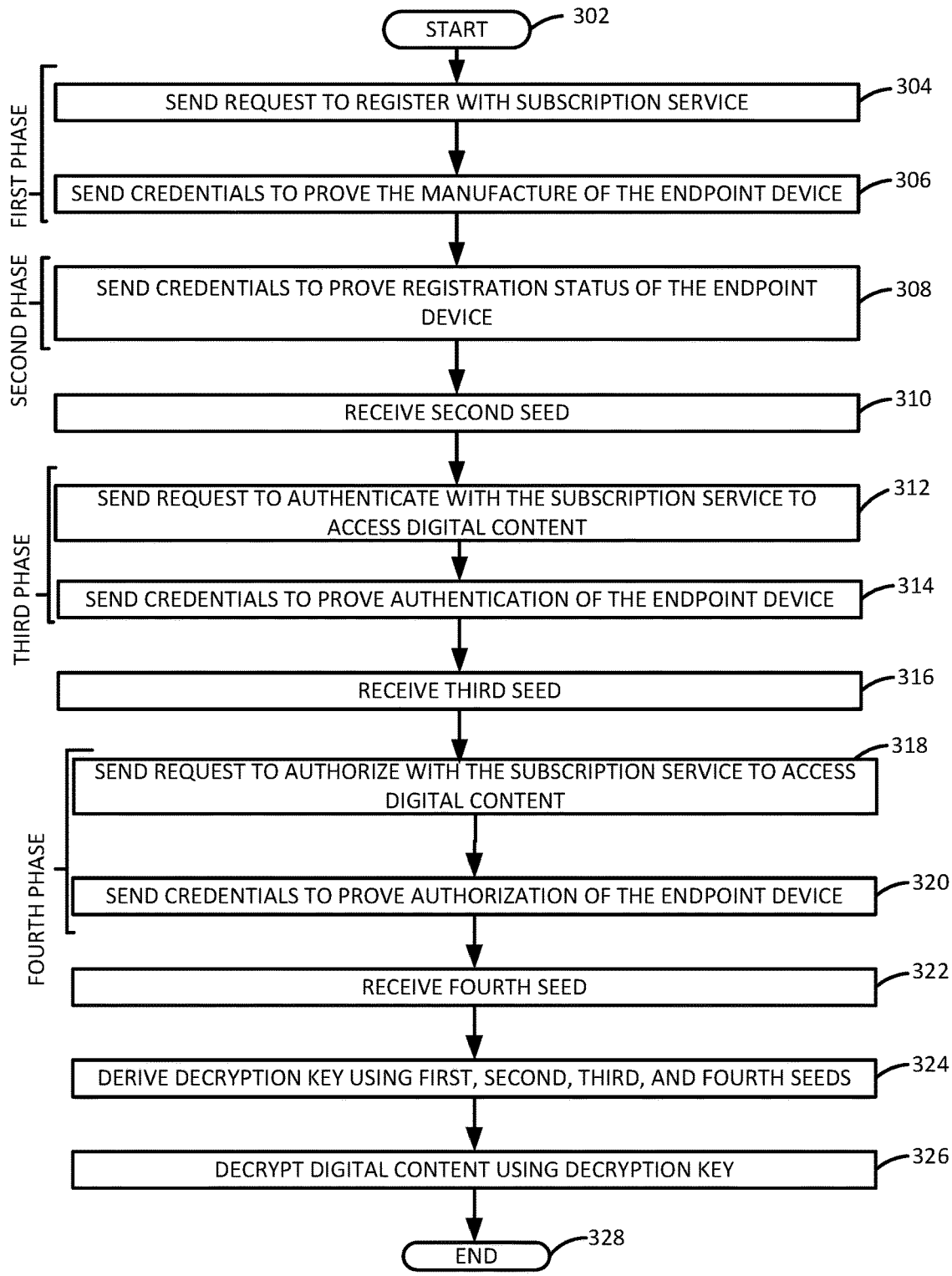
FIG. 3 illustrates a flowchart of an example method for exchanging information to receive seeds in order to derive a decryption key for decrypting digital content.

FIG. 3 illustrates a flowchart of an example method 300 for exchanging information in order to receive seeds to derive a decryption key for decrypting digital content. In one example, the method 300 may be performed by a client device, such as one of the client devices 102 illustrated in FIG. 1 (e.g., by an entity attempting to receive digital content). However, in other examples, the method 300 may be performed by another device. As such, any references in the discussion of the method 300 to the client devices 102 of FIG. 1 (or any other elements of FIG. 1) are not intended to limit the means by which the method 300 may be performed. In one example, the method 300, like the method 200, works in conjunction with a digital content protection process that comprises a plurality of phases for verifying whether a client device is authorized to receive protected digital content.

The method 300 begins in step 302. In step 304, a request to register with a subscription service to access digital content is sent by a client device, e.g., to an application server (e.g., application server 128 of FIG. 1) or to a local server (e.g., local server 104 of FIG. 1) residing in a network that serves a site from which the client device is attempting to access the digital content. In one example, the client device one of multiple client devices that accesses the network from the site. Thus the client device must prove that it is authorized to receive digital content from the subscription service (e.g., that the client device is the authorized device it claims to be).

In step 306, credentials are sent by the client device to prove the manufacture (e.g., make, model, and/or version) of the client device. The credentials sent in step 306 comprise data that verifies that the client device is manufactured by an expected vendor and is capable of performing derivation of content decryption keys with appropriate seeds placed at the time of device manufacture (or provisioning). The credentials may comprise, for instance device identification values (e.g., serial numbers) or other information (e.g., chipset make, model, and/or version) from which the client device can be identified as being correctly manufactured. In one example, the credentials are sent in step 306 in response to an explicit request. However, in another example, the credentials may be sent automatically to start the first (e.g., manufacture) phase of the digital content protection process.

In one example, the client device requesting access to the digital content may have a first (manufacture) seed, $S'_M$, implanted or pre-installed (e.g. by the vendor who manufactured the client device). This first seed $S'_M$ may be used to derive a first root key, $K_R$, from a set of common root key across a set of client devices, and may comprise evidence that the client device is manufactured by an expected vendor. Moreover, the first seed $S'_M$ may be updated by the vendor when needed. In one example the first seed $S'_M$ is a seed that is ultimately used to generate a decryption key K' and corresponds to a seed $S_M$ that is used to generate a corresponding encryption key K. In another example, the first seed $S'_M$ may sent to the client device upon verification of the credentials sent in step 306.

Whether the first seed $S'_M$ is pre-installed or newly sent, the first phase (e.g., the manufacture phase) of the multi-phase digital content protection process may be considered to be complete when it is confirmed that the client device has the first seed $S'_M$.

In step 308, credentials are sent by the client device to prove the registration of the client device. The credentials sent in step 308 comprise data that verifies that the client device installed, or otherwise activated, with a global server (e.g., application server 128 of FIG. 1) that maintains a whitelist for the site from which the client device is purported to be connecting to the network. The credentials may comprise, for instance, a content service subscription account number, a subscriber's login credentials (e.g., user ID and password), the client device's physical location, the client device's network IP address, the client device's media access control (MAC) address, or other information from which the client device can be identified as being correctly registered to a service subscription and location. In one example, the credentials are sent in step 308 in response to an explicit request. However, in another example, the credentials may be sent automatically to start the second (e.g., registration) phase of the digital content protection process.

In step 310, a second (registration) seed, $S'_R$, is received. In one example, the second seed $S'_R$ is received in an encrypted form that can be decrypted using the first root key $K_R$. Thus, the client device will not be able to obtain the second seed $S'_R$ unless it both: (1) passes the manufacture phase (which implies that the client device possesses the first seed $S'_M$ necessary to obtain the first root key $K_R$); and (2) passes the registration phase. In one example, the second seed $S'_R$ can be updated, e.g., when the client device re-registers with the global server after a period of not being active, and/or as requested by the system. In one example the second seed $S'_R$ is a seed that is ultimately used to generate the decryption key K' and corresponds to a seed $S_R$ that is used to generate the corresponding encryption key K.

In step 312, a request to authenticate with the subscription service to access digital content is sent by the client device, e.g., to the application server (e.g., application server 128 of FIG. 1) or to the local server (e.g., local server 104 of FIG. 1).

In step 314, credentials are sent by the client device to prove the authentication of the client device. The credentials may comprise, for instance, a subscriber's login credentials (e.g., user ID and password), the client device's physical location, the client device's network IP address, the client device's media access control (MAC) address, or other information from which the client device can be identified as being previously registered with the global server. The client device may be challenged to see if it possesses the second (registration) seed $S'_R$ that it is expected to have received during the second (registration) phase. The credentials sent in step 314 comprise data that verifies that the client device is authenticated with the global server, previously registered, and in good standing (e.g., not known to be compromised in terms of its behavior or security). In one example, the credentials are sent in step 314 in response to an explicit request. However, in another example, the credentials may be sent automatically to start the third (e.g., authentication) phase of the digital content protection process.

In step 316, a third (authentication) seed, $S'_N$, is received. In one example, the third seed $S'_N$ is received in an encrypted form that can be decrypted using a second root key $K_N$, where the second root key $K_N$ can be obtained using the second seed $S'_R$ and the first root key $K_R$. Thus, the client device will not be able to obtain the third seed $S'_N$ unless it: (1) passes the manufacture phase (which implies that the client device possesses the first seed $S'_M$ necessary to obtain the common root key $K_R$); (2) passes the registration phase (which implies that it has been provided with the second seed $S'_R$); and (3) passes the authentication phase. In one example, the third seed $S'_N$ can be updated, e.g., after every authentication phase. In one example the third seed $S'_N$ is a seed that is ultimately used to generate the decryption key K' and corresponds to a seed $S_N$ that is used to generate the corresponding encryption key K In step 318, a request to authorize with the subscription service to access digital content is sent by the client device, e.g., to the application server (e.g., application server 128 of FIG. 1) or to the local server (e.g., local server 104 of FIG. 1).

In step 320, credentials are sent by the client device to prove the authorization of the client device. The credentials sent in step 320 comprise data that verifies that the client device is authorized to access the requested digital content. The credentials may comprise, for instance, authentication results (e.g., in the form of an authentication token, a cookie, and/or a ticket), a subscription membership, an identification of a piece or a collection of pieces of digital content to be accessed, a proof that the digital content has been purchased, the length of time the digital content was previously accessed by the client device, the number of concurrent content accessing sessions, or other information from which the client device can be identified as being previously authenticated with the global server and permitted to access the requested digital content. The client device may be challenged to see if it possesses the third (authentication) seed $S'_N$ it is expected to have received during the third (authentication) phase.

In step 322, a fourth (authorization) seed, $S'_Z$, is received. In one example, the fourth seed $S'_Z$ is received in an encrypted form that can be decrypted using a third root key $K_Z$, where the third root key $K_Z$ can be obtained using the third seed $S'_N$ and the second root key $K_N$. Thus, the client device will not be able to obtain the fourth seed $S'_Z$ unless it: (1) passes the manufacture phase (which implies that the client device possesses the first seed $S'_M$ necessary to obtain the common root key $K_R$); (2) passes the registration phase (which implies that it has been provided with the second seed S'R); (3) passes the authentication phase (which implies that it has been provided with the third seed $S'_N$); and (4) passes the authorization phase. In one example, the fourth seed $S'_Z$ can be updated, e.g., with periodic authorization or a request by the system. The periodic authorization may be performed via a digital rights management (DRM) license server, may be performed in-band with the digital content, or may be performed in another way. In one example the fourth seed $S'_Z$ is a seed that is ultimately used to generate the decryption key K' and corresponds to a seed $S_Z$ that is used to generate the corresponding encryption key K.

Once the first, second, third, and fourth seeds $S'_M$, $S'_R$, $S'_N$, and $S'_Z$ have been received, the method 300 proceeds to step 324. In step 324, a decryption key is derived using the first, second, third, and fourth seeds $S'_M$, $S'_R$, $S'_N$, and $S'_Z$. In one example, as discussed above, each seed may be used to obtain a key that is used to decrypt a subsequently received seed. In one example (e.g., where the "key ladder" approach described above is used), the last seed received, e.g., the fourth seed $S'_Z$, may be used to obtain a final root key that comprises the decryption key. In other examples, however, the decryption key may be derived in other ways using the first, second, third, and fourth seeds $S'_M$, $S'_R$, $S'_N$, and $S'_Z$.

In step 326, the requested digital content is decrypted using the decryption key derived in step 324. The decrypted digital content may then be played back on the client device.

The method 300 ends in step 328.

Although not expressly specified above, one or more steps of the methods 200 and 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Figure 4:
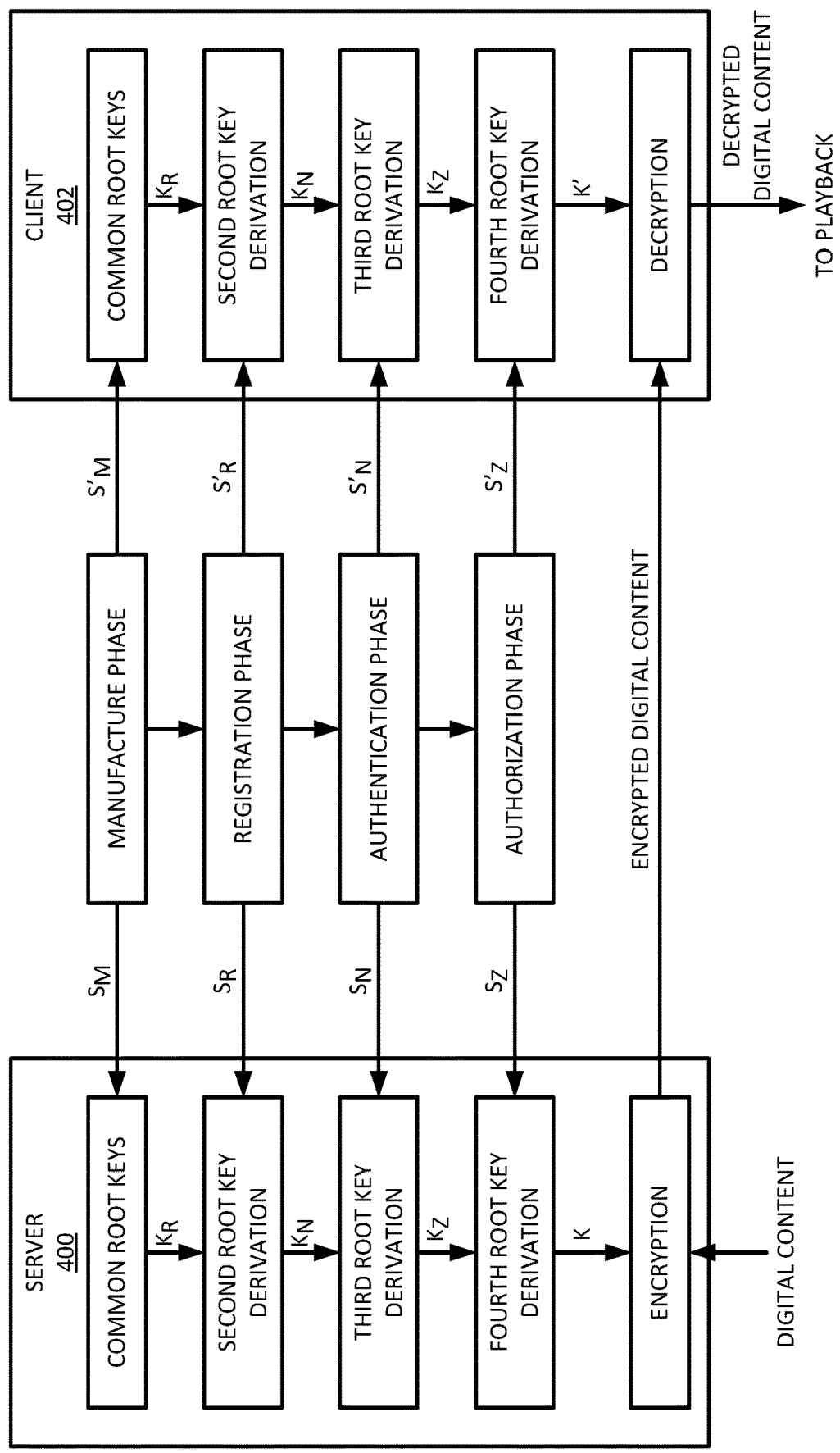
FIG. 4 is a schematic diagram illustrating on example of simultaneous operation of the method of FIG. 2 and the method of FIG. 3.

FIG. 4 is a schematic diagram illustrating an example of simultaneous operation of the method 200 of FIG. 2 and the method 300 of FIG. 3. In particular, FIG. 4 shows an example in which distribution of the seeds is implemented as a key ladder. As shown in FIG. 4, a server 400 performs the operations of the method 200, while a client (e.g., client device) performs the operations of the method 300. The server 400 and client 402 thus work together to perform the various phases of the digital content protection process (e.g., manufacture phase, registration phase, authentication phase, and authorization phase).

During each phase of the digital content protection process, the server 400 and the client 402 are both provided with or derive a seed that helps to decrypt a root key from a set of common root keys. For instance, if the manufacture phase completes successfully, the server 400 receives a first seed $S_M$ while the client 402 receives a corresponding first seed $S'_M$; if the registration phase completes successfully, the server 400 receives a second seed $S_R$ while the client 402 receives a corresponding second seed $S'_R$; if the authentication phase completes successfully, the server 400 receives a third seed $S_N$ while the client 402 receives a corresponding second seed $S'_N$; and if the authorization phase completes successfully, the server 400 receives a fourth seed $S_Z$ while the client 402 receives a corresponding fourth seed $S'_Z$. The receipt of all seeds allows the server 400 and the client 402 to derive an encryption key and a corresponding decrypt key, respectively. For instance, in one example, the last-received seed (e.g., the fourth seed $S_Z$ or $S'_Z$) and the second-to-last last decrypted root key (e.g., third root key $K_Z$) are used to decrypt a final root key K or K' that functions as the encryption key or the decryption key, respectively.

The root key system illustrated in FIG. 4 comprises a "symmetric" key ladder that is used to perform encryption and decryption of digital content. In further examples, two symmetric key ladders could be used to provide further protection of digital content. For instance, a first symmetric key ladder could be used for to perform authentication (e.g., with generation of signing and verification keys), while a second symmetric key ladder could be used to perform encryption (e.g., with generation of encryption and decryption keys).

Figure 5:
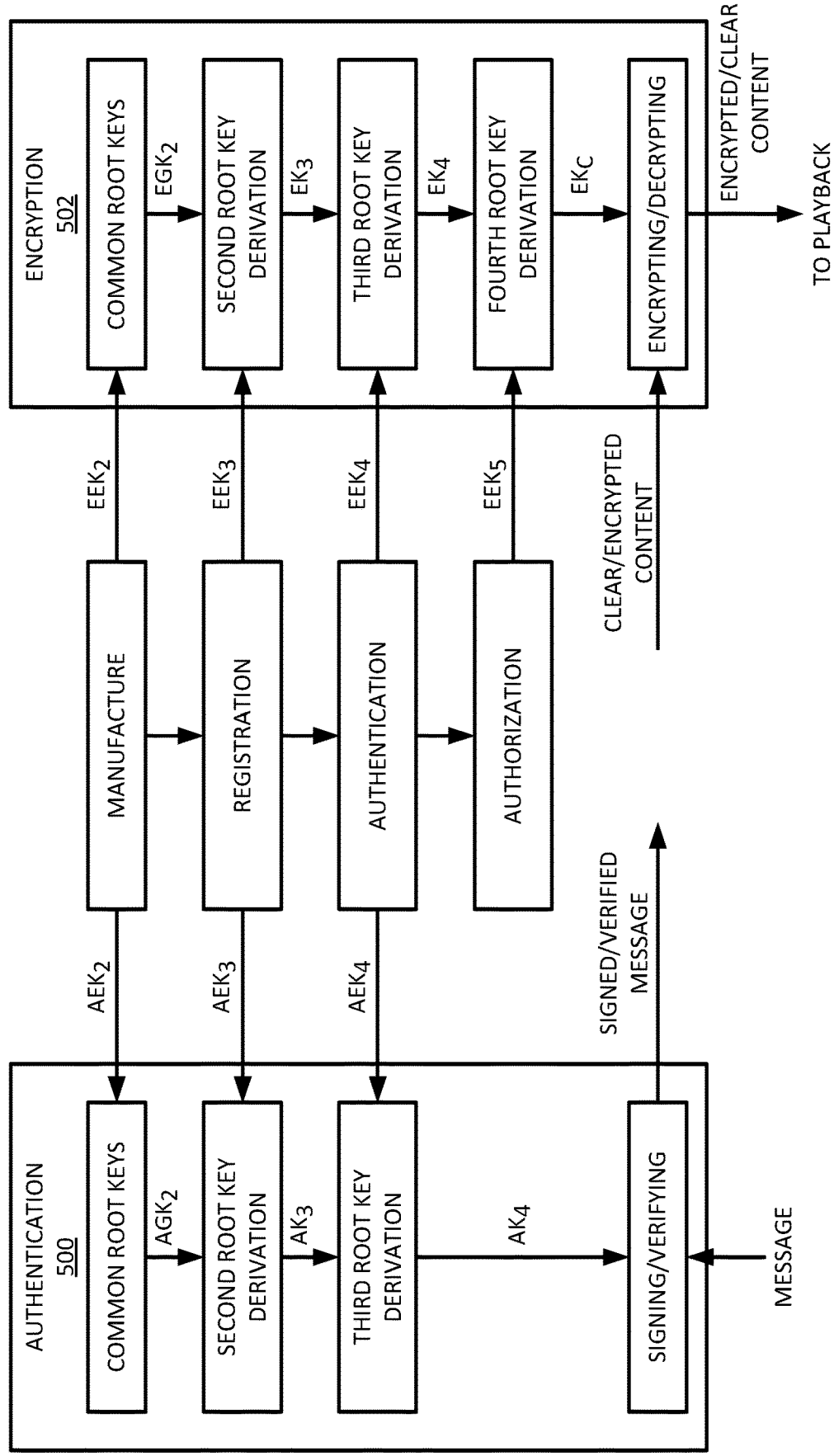
FIG. 5 is a schematic diagram illustrating an example system in which two symmetric key ladders are used to perform authentication and encryption.

FIG. 5, for instance, illustrates an example system in which two symmetric key ladders are used to perform authentication 500 and encryption 502. In this case, a first global key $AGK_2$ has been loaded onto the server and client (e.g., by the vendor(s)) for device and message authentication, while a second global key $EGK_2$ has been loaded onto the server and client (e.g., by the vendor(s)) for content and message encryption.

Subsequent encrypted keys used for authentication 500 and encryption 502 may be different. For instance, authentication 500 may receive subsequent encrypted keys $AEK_3$ and $AEK_4$, while encryption 502 may receive subsequent encrypted keys $EEK_3$, $EEK_4$, and $EEK_5$.

In one example, the plain text, P(M), for generation and verification of a hash-based message authentication code (HMAC) of a 128 bit message, M, all from the global key $AGK_2$, would take the form of: P(M)=32 bit timestamp||128 bit nonce||128 bit message M||padding.

Thus, generation of the HMAC of the 128 bit message M, H(M), using the global key $AGK_2$, would take the form of: H(M)=HMAC(P(M), $AEK_3$, $AEK_4$). As illustrated in FIG. 5, this implies that the key $AK_3$ is derived from the encrypted key $AEK_3$ using the global key $AGK_2$. Then, the key $AK_4$ is derived from the encrypted key $AEK_4$ using the key $AK_3$. The value of H(M) is then calculated using the key $AK_4$. The result is a signed/verified message.

Verification of HMAC of the 128 bit message M, H(M), uses the inputs of the encrypted keys $AEK_3$ and $AEK_4$, using the plain text P(M), and the hash function H to generate a yes or no output (e.g., where yes indicates verification of the message M and no indicates no verification of the message M). In this case, the key $AK_3$ is derived from the encrypted key $AEK_3$ using the global key $AGK_2$. Then, the key $AK_4$ is derived from the encrypted key $AEK_4$ using the key $AK_3$. The value of H(M) is then calculated using the key $AK_4$, and compared to H to determine whether or not the message M is verified.

Content encryption and decryption happen after the encrypted keys $EEK_3$ and $EEK_4$ have been separately loaded, which results in the corresponding keys $EG_3$ and $EK_4$, respectively, being derived from the global key $EGK_2$ and stored within the client and/or server.

Thus, at each phase of the digital content protection process (e.g., manufacture, registration, authentication, and authorization), two seeds may be generated: one seed for device and message authentication and one seed for content and message encryption.

Figure 6:
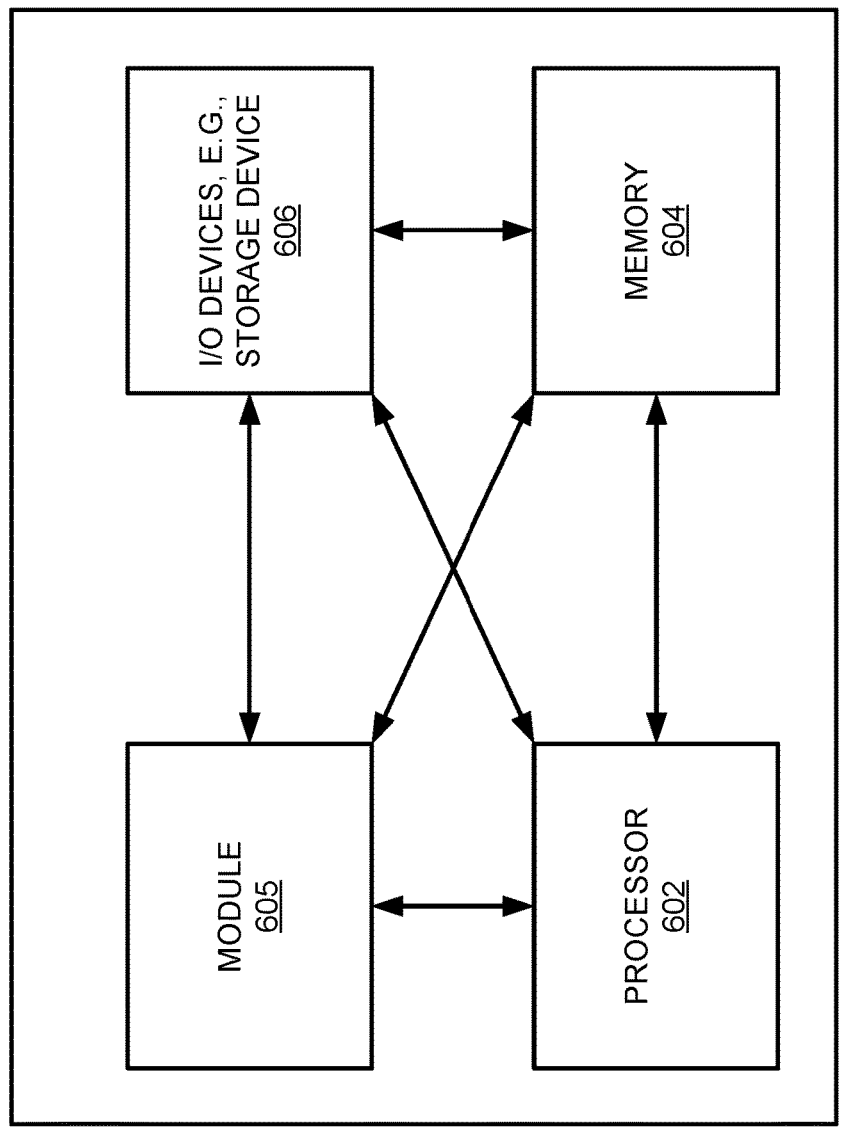
FIG. 6 depicts a high-level block diagram of a computing device specifically programmed to perform the functions described herein.

FIG. 6 depicts a high-level block diagram of a computing device specifically programmed to perform the functions described herein. For example, any one or more components or devices illustrated in FIG. 1 or described in connection with the methods 200 and 300 may be implemented as the system 600. For instance, an application server 128 or local server 104 FIG. 1 (such as might be used to perform the method 200) could be implemented as illustrated in FIG. 6. In another example, a client device 102 FIG. 1 (such as might be used to perform the method 300) could be implemented as illustrated in FIG. 6.

As depicted in FIG. 6, the system 600 comprises a hardware processor element 602, a memory 604, a module 605 for multi-phase digital content protection, and various input/output (I/O) devices 606.

The hardware processor 602 may comprise, for example, a microprocessor, a central processing unit (CPU), or the like. The memory 604 may comprise, for example, random access memory (RAM), read only memory (ROM), a disk drive, an optical drive, a magnetic drive, and/or a Universal Serial Bus (USB) drive. The module 605 for multi-phase digital content protection may include circuitry and/or logic for performing special purpose functions relating to encrypting and/or decrypting digital content. The input/output devices 606 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for multi-phase digital content protection (e.g., a software program comprising computer-executable instructions) can be loaded into memory 604 and executed by hardware processor element 602 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for multi-phase digital content protection (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
    receiving, by at least one processor, a request for accessing a digital content from a client device;
    initiating, by the at least one processor, a digital content protection process comprising a plurality of phases, where each phase of the plurality of phases includes verifying credentials provided by the client device, wherein the plurality of phases comprises:
        a manufacture phase for verifying a manufacture of the client device by an expected vendor;
        a registration phase for verifying a registration of the client device with a global server that maintains a whitelist for a site;
        an authentication phase for verifying an authentication of the client device with the global server; and
        an authorization phase for verifying that the client device is authorized to access the digital content;
    delivering, by the at least one processor, a plurality of seeds to the client device, wherein each individual seed of the plurality of seeds is delivered to the client device upon a successful completion of one phase of the plurality of phases;
    encrypting, by the at least one processor, the digital content, using an encryption key derived using the plurality of seeds, to generate an encrypted content; and
    delivering, by the at least one processor, the encrypted content to the client device.

2. The method of claim 1, wherein the plurality of seeds comprises:
    a first seed delivered after a successful completion of the manufacture phase;
    a second seed delivered after a successful completion of the registration phase;
    a third seed delivered after a successful completion of the authentication phase; and
    a fourth seed delivered after a successful completion of the authorization phase.

3. The method of claim 2, wherein the first seed is associated with a collection of devices, and the first seed is pre-installed by the expected vendor on the client device at a time of manufacture of the client device.

4. The method of claim 2, wherein the first seed is associated with a collection of devices, and the first seed is updated by the expected vendor.

5. The method of claim 2, wherein the second seed is associated with registered devices at the site, and the second seed is updated by the global server.

6. The method of claim 2, wherein the third seed is associated with authenticated devices, and the third seed is updated by a local server that serves the site.

7. The method of claim 2, wherein the fourth seed is associated with authorized digital content, and the fourth seed is updated by a local server that serves the site.

8. The method of claim 2, wherein the first seed is used to derive a first root key from a set of root keys.

9. The method of claim 8, wherein the second seed is delivered in an encrypted form that is decrypted using the first root key.

10. The method of claim 9, wherein the third seed is delivered in an encrypted form that is decrypted using a second root key, wherein the second root key is derived from the first root key and the second seed.

11. The method of claim 10, wherein the fourth seed is delivered in an encrypted form that is decrypted using a third root key, wherein the third root key is derived from the second root key and the third seed.

12. The method of claim 11, wherein the encryption key is derived from the third root key and the fourth seed.

13. The method of claim 11, wherein the fourth seed is delivered in-band with the encrypted content.

14. A method, comprising:
sending, by a client device, a request for accessing a digital content;
engaging, by the client device, in a digital content protection process with a server, wherein the digital content protection process comprises a plurality of phases, and wherein each phase of the plurality of phases includes providing credentials to the server, wherein the plurality of phases comprises:
a manufacture phase for verifying a manufacture of the client device by an expected vendor;
a registration phase for verifying a registration of the client device with a global server that maintains a whitelist for a site;
an authentication phase for verifying an authentication of the client device with the global server; and
an authorization phase for verifying that the client device is authorized to access the digital content;
receiving, by the client device, a plurality of seeds from the server, wherein each individual seed of the plurality of seeds is received by the client device upon a successful completion of one phase of the plurality of phases;
receiving, by the client device, the digital content in an encrypted form upon a successful completion of all phases of the plurality of phases; and
decrypting, by the client device, the digital content using a decryption key derived using the plurality of seeds.

15. A non-transitory computer-readable medium storing instructions which, when executed by the processor of a client device, cause the processor to perform operations, the operations comprising:
sending a request for accessing a digital content;
engaging in a digital content protection process with a server, wherein the digital content protection process comprises a plurality of phases, and wherein each phase of the plurality of phases includes providing credentials to the server, wherein the plurality of phases comprises:
a manufacture phase for verifying a manufacture of the client device by an expected vendor;
a registration phase for verifying a registration of the client device with a global server that maintains a whitelist for a site;
an authentication phase for verifying an authentication of the client device with the global server; and
an authorization phase for verifying that the client device is authorized to access the digital content;
receiving a plurality of seeds from the server, wherein each individual seed of the plurality of seeds is received by the client device upon a successful completion of one phase of the plurality of phases;
receiving the digital content in an encrypted form upon a successful completion of all phases of the plurality of phases; and
decrypting the digital content using a decryption key derived using the plurality of seeds.

16. The non-transitory computer-readable medium of claim 15, wherein the plurality of seeds comprises:
a first seed delivered after a successful completion of the manufacture phase;
a second seed delivered after a successful completion of the registration phase;
a third seed delivered after a successful completion of the authentication phase; and
a fourth seed delivered after a successful completion of the authorization phase.

17. The non-transitory computer-readable medium of claim 16, wherein the first seed is used to derive a first root key from a set of root keys.

18. The non-transitory computer-readable medium of claim 17, wherein:
the second seed is delivered in an encrypted form that is decrypted using the first root key;
the third seed is delivered in an encrypted form that is decrypted using a second root key, wherein the second root key is derived from the first root key and the second seed;
the fourth seed is delivered in an encrypted form that is decrypted using a third root key, wherein the third root key is derived from the second root key and the third seed; and
the encryption key is derived from the third root key and the fourth seed.

19. The method of claim 14, wherein the plurality of seeds comprises:
a first seed received after a successful completion of the manufacture phase;
a second seed received after a successful completion of the registration phase;
a third seed received after a successful completion of the authentication phase; and
a fourth seed received after a successful completion of the authorization phase.

20. The method of claim 19, wherein the first seed is used to derive a first root key from a set of root keys.

* * * * *